(12) United States Patent
Ladabaum et al.

(10) Patent No.: US 7,635,332 B2
(45) Date of Patent: *Dec. 22, 2009

(54) SYSTEM AND METHOD OF OPERATING MICROFABRICATED ULTRASONIC TRANSDUCERS FOR HARMONIC IMAGING

(75) Inventors: Igal Ladabaum, San Carlos, CA (US); Satchi Panda, Fremont, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 579 days.

This patent is subject to a terminal disclaimer.

(21) Appl. No.: 10/958,626

(22) Filed: Oct. 4, 2004

(65) Prior Publication Data

US 2005/0124882 A1 Jun. 9, 2005

Related U.S. Application Data

(63) Continuation-in-part of application No. 10/819,094, filed on Apr. 5, 2004, which is a continuation-in-part of application No. 10/367,106, filed on Feb. 14, 2003, now Pat. No. 7,087,023.

(60) Provisional application No. 60/508,391, filed on Oct. 3, 2003, provisional application No. 60/460,638, filed on Apr. 4, 2003.

(51) Int. Cl.
*A61B 8/00* (2006.01)

(52) U.S. Cl. .................. 600/437; 600/443; 600/459; 73/602; 73/621; 73/642; 367/101; 367/103; 367/153

(58) Field of Classification Search .................. 367/95, 367/99, 101, 103, 153, 157; 600/437, 443, 600/459; 310/317, 318; 381/190; 73/602, 73/621, 642
See application file for complete search history.

(56) References Cited

U.S. PATENT DOCUMENTS

| 2,999,986 | A | 9/1961 | Holbrook |
| 4,145,931 | A | 3/1979 | Tancrell |
| 4,341,120 | A | 7/1982 | Anderson |
| 4,670,683 | A | 6/1987 | T'Hoen |

(Continued)

FOREIGN PATENT DOCUMENTS

DE 32 19 223 11/1983

(Continued)

*Primary Examiner*—Brian Casler
*Assistant Examiner*—Parikha S Mehta

(57) ABSTRACT

A capacitive microfabricated ultrasonic transducer (cMUT) is operated to improve its performance during harmonic imaging in non-linear media, such as in contrast agents or in human tissue. The cMUT is operated by inverting the transmit waveform to adjacently spaced azimuth elements, and combining at least two additional firings without adjacent inversion, for each transmit vector, thereby canceling the second harmonic generation of the cMUT; and thus, the performance of harmonic imaging using the cMUTs can achieve improvement.

13 Claims, 5 Drawing Sheets

U.S. PATENT DOCUMENTS

| | | | |
|---|---|---|---|
| 4,694,434 A | 9/1987 | Von Ramm et al. | |
| 4,736,630 A | 4/1988 | Takahashi et al. | |
| 4,888,746 A | 12/1989 | Wurster et al. | |
| 5,229,933 A | 7/1993 | Larson | |
| 5,233,993 A | 8/1993 | Kawano | |
| 5,301,168 A | 4/1994 | Miller | |
| 5,415,175 A | 5/1995 | Hanafy et al. | |
| 5,490,512 A | 2/1996 | Kwon et al. | |
| 5,619,476 A | 4/1997 | Haller et al. | |
| 5,627,580 A | 5/1997 | Nelson | |
| 5,632,277 A | 5/1997 | Chapman et al. | |
| 5,651,365 A | 7/1997 | Hanafy et al. | |
| 5,671,746 A | 9/1997 | Dreschel et al. | |
| 5,706,819 A | 1/1998 | Hwang et al. | |
| 5,768,007 A | 6/1998 | Knipe et al. | |
| 5,870,351 A | 2/1999 | Ladabaum et al. | |
| 5,894,452 A | 4/1999 | Ladabaum et al. | |
| 5,902,243 A | 5/1999 | Holley et al. | |
| 5,944,666 A | 8/1999 | Hossack et al. | |
| 5,947,904 A | 9/1999 | Hossack et al. | |
| 5,951,478 A | 9/1999 | Hwang et al. | |
| 5,961,463 A | 10/1999 | Rhyne et al. | |
| 5,982,709 A | 11/1999 | Ladabaum et al. | |
| 6,004,832 A | 12/1999 | Haller et al. | |
| 6,102,860 A | 8/2000 | Mooney | |
| 6,104,670 A * | 8/2000 | Hossack et al. | 367/7 |
| 6,108,572 A * | 8/2000 | Panda et al. | 600/407 |
| 6,122,223 A | 9/2000 | Hossack | |
| 6,126,602 A | 10/2000 | Savord et al. | |
| 6,159,153 A | 12/2000 | Dubberstein et al. | |
| 6,172,797 B1 | 1/2001 | Huibers | |
| 6,186,950 B1 | 2/2001 | Averkiou et al. | |
| 6,246,158 B1 | 6/2001 | Ladabaum | |
| 6,271,620 B1 | 8/2001 | Ladabaum | |
| 6,292,435 B1 | 9/2001 | Savord et al. | |
| 6,328,697 B1 | 12/2001 | Fraser | |
| 6,381,197 B1 | 4/2002 | Savord et al. | |
| 6,425,869 B1 | 7/2002 | Rafter et al. | |
| 6,436,046 B1 | 8/2002 | Napolitano et al. | |
| 6,443,901 B1 | 9/2002 | Fraser | |
| 6,461,299 B1 | 10/2002 | Hossack | |
| 6,491,631 B2 | 12/2002 | Chiao et al. | |
| 6,527,723 B2 | 3/2003 | Ossmann et al. | |
| 6,551,248 B2 | 4/2003 | Miller | |
| 6,562,650 B2 | 5/2003 | Ladabaum | |
| 6,571,445 B2 | 6/2003 | Ladabaum | |
| 6,645,145 B1 | 11/2003 | Dreschel et al. | |
| 6,656,123 B2 * | 12/2003 | Jensen et al. | 600/458 |
| 6,676,602 B1 | 1/2004 | Barnes et al. | |
| 6,709,395 B2 | 3/2004 | Poland | |
| 6,749,570 B2 | 6/2004 | Ustuner, et al. | |
| 6,795,374 B2 * | 9/2004 | Barnes et al. | 367/138 |
| 7,087,023 B2 | 8/2006 | Daft et al. | |
| 7,311,667 B2 | 12/2007 | Cai et al. | |
| 7,508,113 B2 | 3/2009 | Daft et al. | |
| 2003/0048698 A1 | 3/2003 | Barnes et al. | |
| 2005/0119575 A1 | 6/2005 | Ladabaum et al. | |
| 2006/0173342 A1 | 8/2006 | Panda et al. | |

FOREIGN PATENT DOCUMENTS

| | | |
|---|---|---|
| EP | 0 978 822 | 2/2000 |
| WO | WO 0030543 | 6/2000 |
| WO | US/2004/002740 | 7/2004 |

* cited by examiner

SYSTEM AND METHOD OF OPERATING MICROFABRICATED ULTRASONIC TRANSDUCERS FOR HARMONIC IMAGING

CROSS-REFERENCE TO RELATED APPLICATIONS

The present application claims priority to U.S. Provisional Application Ser. No. 60/508,391 filed Oct. 3, 2003, and is a continuation in part of, and claims the benefit of priority under 35 USC .sctn.120 from, commonly-owned U.S. patent application Ser. No. 10/819,094 filed Apr. 5, 2004 (hereinafter, "the '094 application"), entitled "Method and Apparatus for Improving the Performance of Capacitive Acoustic Transducers using Bias Polarity Control and Multiple Firings," the content of which is incorporated herein by reference in its entirety and for all purposes, which application claims priority to U.S. Provisional Patent Application 60/460,638 filed Apr. 4, 2003 and is a continuation-in-part of commonly-owned U.S. patent application Ser. No. 10/367,106 filed Feb. 14, 2003 now U.S. Pat. No. 7,087,023 (hereinafter, "the '106 application"), entitled "Microfabricated Ultrasonic Transducers with Bias Polarity Beam Profile Control and Method of Operating the Same," the content of which is incorporated herein by reference in its entirety and for all purposes.

FIELD OF THE INVENTION

Generally, the present invention relates to the field of acoustic transducers. More specifically, the present invention relates to harmonic imaging using capacitive microfabricated ultrasonic transducers.

BACKGROUND OF THE INVENTION

An acoustic transducer is an electronic device used to emit and receive sound waves. Ultrasonic transducers are acoustic transducers that operate at frequencies above 20 KHz, and more typically, in the 1-20 MHz range. Ultrasonic transducers are used in medical imaging, non-destructive evaluation, and other applications. The most common forms of ultrasonic transducers are piezoelectric transducers. In U.S. Pat. No. 6,271,620 entitled, "Acoustic Transducer and Method of Making the Same," issued Aug. 7, 2001, Ladabaum describes microfabricated acoustic transducers capable of competitive performance compared to piezoelectric transducers.

The basic transduction element of the microfabricated ultrasonic transducer (MUT) described by this prior art is a vibrating capacitor. A substrate contains a lower electrode, a thin diaphragm is suspended over the substrate, and a metallization layer serves as an upper electrode. If a DC bias is applied across the lower and upper electrodes, an acoustic wave impinging on the diaphragm will set it in motion, and the variation of electrode separation caused by such motion results in an electrical signal. Conversely, if an AC signal is applied across the biased electrodes, the AC forcing function will set the diaphragm in motion, and this motion emits an acoustic wave in the medium of interest.

FIG. 1 illustrates the naming conventions of orientation and direction used in ultrasound engineering. As shown in FIG. 1, the transducer array 100 is typically made up of multiple transducer elements 110. In the case of capacitive microfabricated transducers, each of the transducer elements 110 includes a plurality of individual transducer cells. The transducer elements 110 are oriented such that their lengths are along the elevation axis, and their widths are along the azimuth axis. The transducer elements 110 are adjacent to one another along the azimuth axis.

Currently, the most common forms of ultrasound imaging systems generate images by electronic scanning in either linear format or sector format. FIG. 2 illustrates the linear 210 and sector 220 image formats generated by a typical ultrasound system. In linear format scanning, time delays between transducer elements are used to focus the ultrasound beam in the image plane. In sector format scanning, time delays between transducer elements are used both to focus the ultrasound beam and to steer it. Typically, the sector scan format 220 is used to image a relatively large, deep portion of the anatomy from a small acoustic window (e.g., imaging the heart); whereas the linear scan format 210 is used for optimum image quality near the face of the transducer (e.g., imaging the carotid).

An ultrasound imaging system, whether in linear or sector format, forms an image by combining the results of many transmit-receive sequences. Each transmit-receive event is commonly referred to as a "beam" or a "vector" because appropriate delays are applied between the transmit waveform of each element such that the transmit energy is directed in a specific direction towards a specific region of the image being formed, and delays are dynamically applied to the received waveforms of the elements such that a line of the image can be formed along this direction. FIG. 3 illustrates, for a convex linear probe 300, made of elements 310, a set of vectors 320 used to form the image. A complete image frame is formed from approximately 100 to 300 hundred such vectors, and ultrasound systems generate approximately 30 frames per second.

Harmonic imaging is an important modality in diagnostic ultrasound. Harmonic imaging results when the subject of interest is interrogated with ultrasonic waveforms centered around frequency f, and then the return, or echo, signal is detected around a harmonic frequency of f, for example, 2f. Human tissue generates harmonics, as do contrast agents. Harmonics need not be limited to 2f, they can be 3f or higher, or sub-harmonics. It is very important for harmonic imaging that the transmitted ultrasound be free of harmonics, or that these transmitted harmonics be subtracted out in subsequent received waveform signal processing.

Capacitive transducers can transmit harmonics because the force on the diaphragm is proportional to the square of the applied voltage excitation waveform. Further non-linearity stems from the fact that the force on the diaphragm is also dependent, in a quadratic manner, on the position of the diaphragm relative to its resting state. Because broadband transducer designs have diaphragms that respond to such non-linear forcing functions in a meaningful manner, they transmit harmonics. Harmonic transmission from the transducer is undesirable in tissue harmonic imaging and contrast agent imaging because these imaging modalities are based on forming images with harmonics generated by the tissue or the contrast agent, not by the harmonics transmitted by a sub-optimal transmitter.

The use of pre-distorted input signals in electronic systems so as to reduce the harmonic content of an output signal is a technique that has been used in electronics for a long time and is well known in the art. For example, Holbrook et al., in U.S. Pat. No. 2,999,986 issued in 1961, teach a pre-distortion technique to reduce harmonics generated by a non-linear vacuum tube. Savord et al. received U.S. Pat. No. 6,292,435 for the application of pre-distorted signals to capacitive microfabricated ultrasonic transducers (cMUT). Fraser received U.S. Pat. No. 6,443,901 also for the application of pre-distorted signals to cMUTs. Hossack, in U.S. Pat. No.

6,461,299 teaches different pre-distortion methods to those taught in Savord et al. and Fraser. Savord et al., Fraser, and Hossack exclusively teach pre-distortion approaches to remove harmonics from the transmit signal. Pre-distortion approaches place design challenges on a system's transmitter. At best, they require a sophisticated and relatively expensive transmitter. At worst, the approach requires an entirely new ultrasound system to operate cMUTs in harmonic imaging mode.

In U.S. Pat. No. 5,233,993, Kawano teaches a method whereby an ultrasound system forms an image based on the combination of two echoes from two transmit signals in the same scanning direction. In U.S. Pat. No. 5,632,277 Chapman et al. teach a method of generating an ultrasound image that enhances regions of non-linear scattering media by using two transmit signals 180 degrees apart in phase. In such an approach, the received echoes from linear media will be opposites of each other and cancel if added, but if a region is non-linear, there will be no significant difference in the received echoes of the harmonic energy. Further, Hwang et al., in U.S. Pat. Nos. 5,706,819 and 5,951,478, teach specifics of such an approach for imaging with contrast agents. Averkiou et al., in U.S. Pat. No. 6,186,950, introduce improvements to such pulse inversion harmonic imaging by using more than two temporally spaced transmit pulses per pulse-echo sequence. U.S. Pat. Nos. 5,902,243 to Holley et al. and 5,961,463 to Rhyne et al. teach specifics of useful transmit waveforms. Common to all such prior art is that the method taught for producing suitable transmit waveforms uses the signal generator of the ultrasound system to distort, encode, or sequentially phase invert the transmit waveforms of each element, where the only relationship of the waveforms of adjacent elements is that governed by the appropriate delays in the azimuth direction.

In the '638 provisional application to Panda et al., methods of combining bias polarity patterns and multiple firings are taught that enable the cancellation of transducer-emitted harmonics. Panda et al. teach that a tight spatial distribution of alternating bias polarity across a cMUT element's aperture results in a transducer whose fundamental content is effectively canceled, but whose even harmonic content is the same as that of a cMUT with the same polarity bias across its aperture. Panda et al. present a mode of operating a cMUT in such a way that only its even harmonic content effectively radiates. When used in a method of multiple transmit firings and received signal combinations, this harmonic-only mode of operation can be used to remove the effects of cMUT generated harmonics. The disadvantage of the '638 provisional application is that it requires a cMUT specifically fabricated with electrodes and/or connections such that bias polarity in the elevation direction can be varied, and a system capable of supplying the control for such bias electrodes and/or connections.

It is therefore desirable to provide a method of operating a cMUT in harmonic imaging without necessitating pre-distorted waveforms or elevation bias control.

The present inventors have realized that by simply inverting the transmit waveform to adjacently spaced azimuth elements, and combining at least two additional firings without adjacent inversion for each transmit vector, the second harmonic generation (and other even harmonics) of the cMUT can be canceled, and thus harmonic imaging with cMUTs can achieve improved performance.

SUMMARY OF THE INVENTION

The present invention provides a method of operating a microfabricated ultrasonic transducer to improve its performance in imaging non-linear media, such as in contrast agent imaging or tissue harmonic imaging.

The present invention further provides a method of imaging non-linear media in a manner that does not require pre-distortion of the transmit signal or bias polarity control in the elevation direction.

The present invention achieves these and other improvements in the art by providing a system including a cMUT transducer, and a method of operating the transducer with sequences of transmit patterns applied to adjacent elements and combinations of received waveforms.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
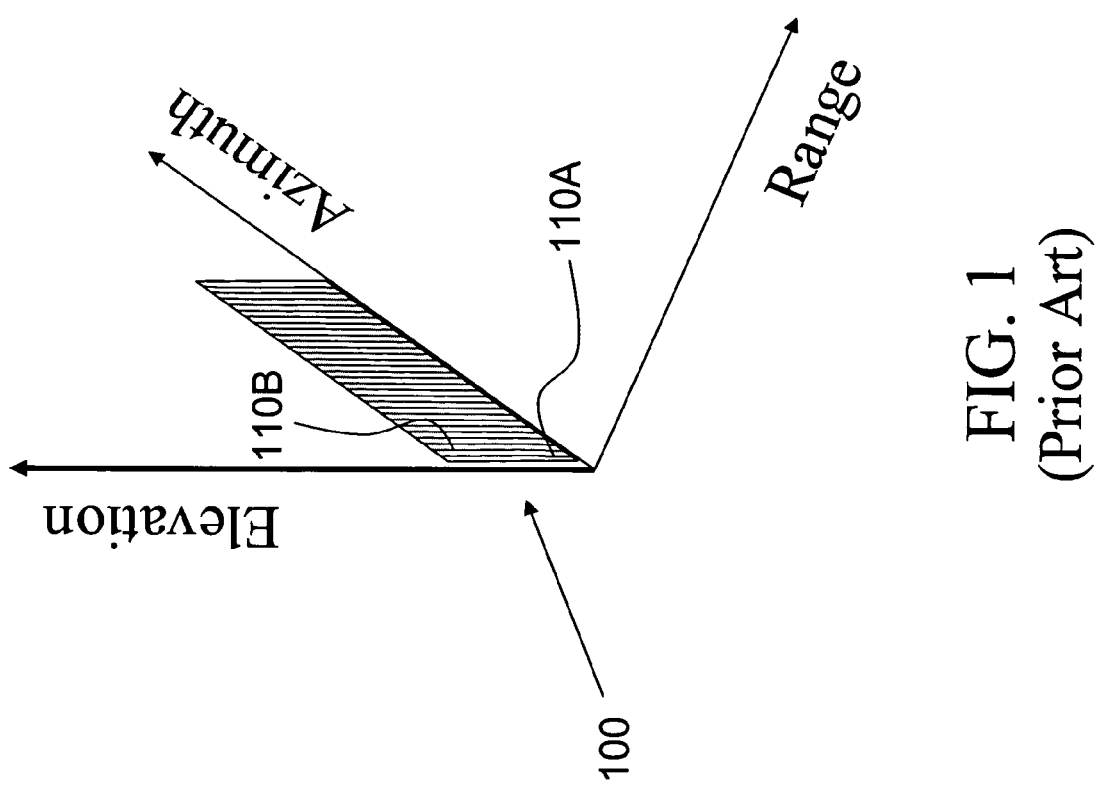
FIG. 1 illustrates the naming conventions of orientation and direction used in ultrasound engineering.
Figure 2:
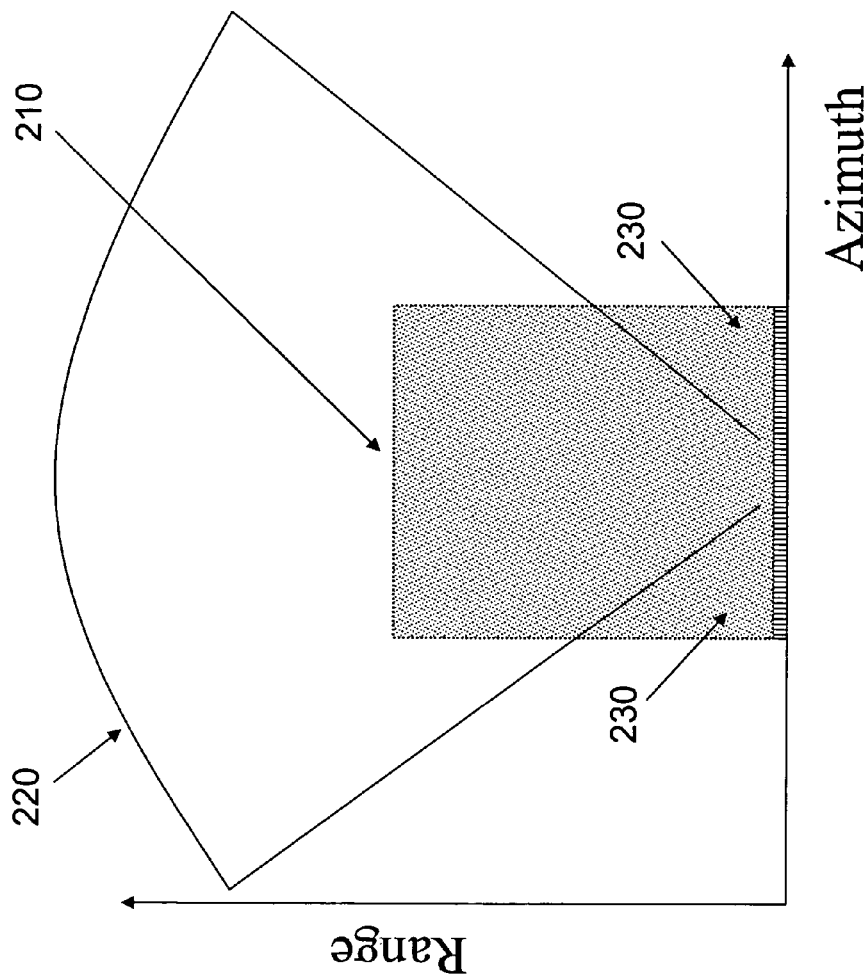
FIG. 2 illustrates the linear and sector imaging formats generated by a typical ultrasound system.

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

The present invention relates to a method and system for capacitive microfabricated ultrasonic transducer (cMUT) arrays to be used in harmonic imaging. FIGS. 4A-C illustrate the basic concepts of the present invention as applied to a simple linear array 100. In this embodiment, as shown in FIG. 4A, transmit beams 150A are generated by applying properly delayed excitation waveforms to at least several elements 110. The only difference between waveforms applied to elements 110 is their delay profile, which is conceptually illustrated by the plus sign pattern 140A. FIG. 4B illustrates that, in order to provide for the cancellation (during receive processing) of the fundamental in harmonic imaging mode, transmit beams 150B with inverted waveforms 140B are launched. The enabling essence of the present invention is illustrated in FIG. 4C, where transmit beams 150C are launched that only contain the even and undesired harmonics generated by the transducer (for subsequent cancellation so that only tissue or contrast-generated harmonics are used to form the image). These harmonic transmit beams 150C are generated by alternating the polarity of the waveforms generated by elements 110, as illustrated by the alternating pattern 140C. It should be noted that no mention of the cMUT bias has been made, only the transmitted waveforms, because the harmonic imaging results of the present invention can be used with virtually any bias or combination of biases across the transducer elements.

To achieve the waveforms as illustrated in relation to FIGS. 4A-C, the cMUT of the present invention, for example, is used in a system that is capable of supplying inverted waveforms to alternating channels. Further, if such a system can supply arbitrary waveforms, as well as the inverted waveforms, then, as another aspect of this embodiment, inherent asymmetries in the cMUT can be overcome. Within a cMUT that has a given bias, any given transducer cell that is excited by a given waveform will not react exactly opposite to an adjacent cell that is excited by an inverted waveform. The reaction to the inverted waveform, for example, might be slightly smaller in amplitude or slightly different in spectral shape as compared to the reaction of the non-inverted waveform. A system according to the present invention that can provide arbitrary waveforms to each cMUT channel can be used to ensure that the acoustic output of the inverted and non-inverted waveforms is exactly opposite, thereby providing more thorough cancellation of the fundamental and transmitted harmonics during harmonic imaging.

In one embodiment of the present invention, an image frame is formed from approximately 100 to 300 vectors, each vector formed from the combination of 3 transmit-receive sequences. However, as will be apparent to those skilled in the art, an image frame can formed from any number of vectors and each vector can be formed from any number of transmit-receive sequences. Such variations are intended to be within the scope of Applicants' invention. When using ultrasound imaging, frame rate depends on the depth of the desired penetration and the medium in which the imaging is being performed. For example, when performing ultrasound imaging on human tissue, sound travels at approximately 1.5 mm/microsecond. Achieving a 15 cm penetration requires 200 microseconds for the 30 cm round trip. A simple 100 beam frame would take 20 milliseconds per frame, or allow for 50 frames per second. Further, if each one of the 100 beams requires 3 full transmit-receive sequences, then instead of 50 frames per second, the frame rate would be about 17 frames per second. As a variation to this example, if a 5 cm penetration were desired, the frame rate would be about 3 times faster, or 50 frames per second. As another variation to this example, if each frame was formed from 300 beams instead of 100 beams, then the frame rate would be 3 times slower.

The 3 transmit-receive sequences are preferably performed serially for each vector to minimize the effects of tissue motion between transmissions. Tissue motion between the start and finish of the 3 transmit-receive sequences that make up one beam can be detrimental because it reduces the degree of cancellation that the combination of the sequences will be able to achieve; changes between vectors are more tolerable. However the scope of the present invention is not intended to be limited this serial implementation. For instance, in the example above (i.e., 100 beams per frame, 3 transmit-receive sequences per beam), it could be that the first transmit-receive sequences of all beams for a frame are fired, followed by the second sequences of all beams for that frame, finally followed by the third sequences of all beams of that frame. After such a firing order, post-processing could be performed to complete the frame. One of ordinary skill in the art will see that, depending on the number of beams per frame and sequences per beam, a vast array of possible firing and process arrangements are possible.

Figure 4:
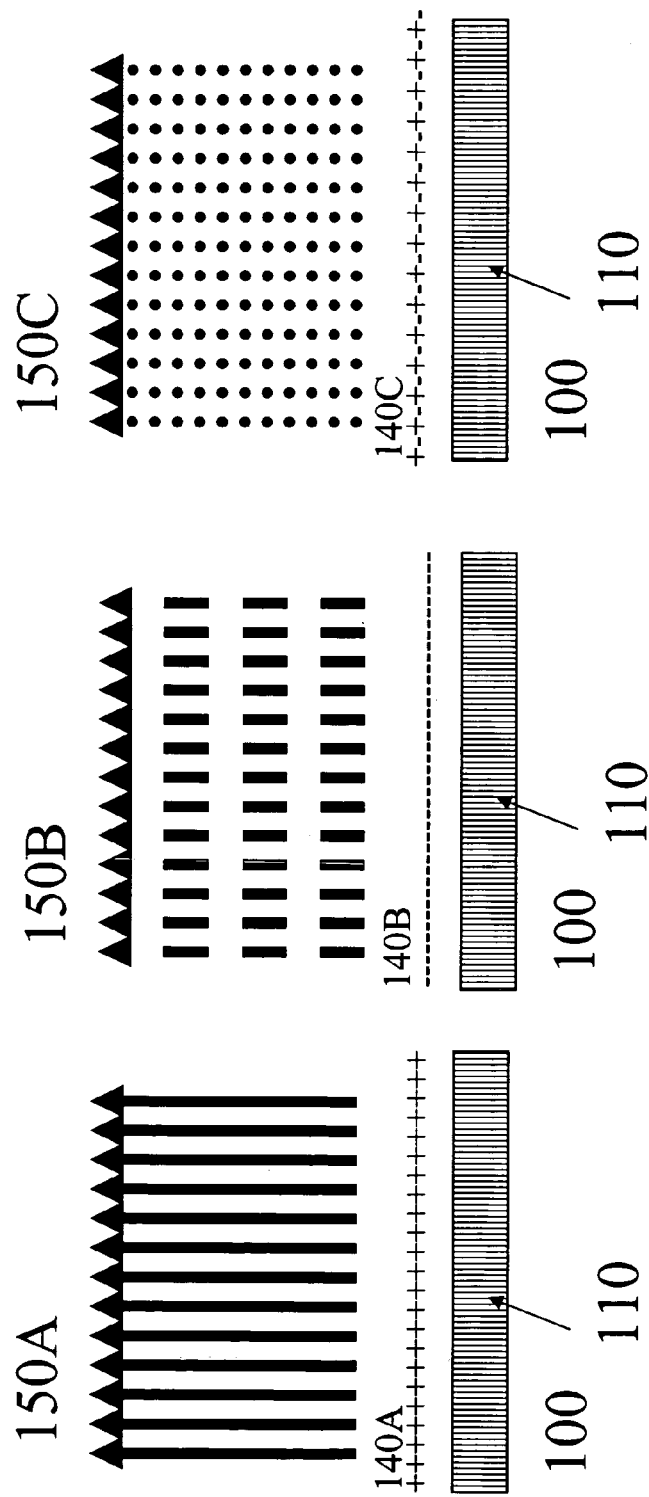
FIGS. 4A-C illustrate the basic concept of the fundamental and harmonic content of each vector of an exemplary 3-firing scheme of a linear array according to the present invention.

The formula below demonstrates how to mathematically combine the received components of the 3 separate firings 140A, 140B, and 140C of FIG. 4 to isolate only those harmonics generated in the tissue:

$$F1+F2-(2*F3)=[\text{tissue-generated harmonics only}],$$

where F1 is the received voltage vs. time data from the first firing 140A of FIG. 4A, F2 is the received voltage vs. time data from the second firing 140B, and F3 is the received voltage vs. time data from the third firing 140C. To cancel all received tissue-structure echoes from the transmitted fundamental frequency component and harmonics arising from non-linearities in the cMUT, simply add F1 to F2 and subtract two times F3. This equation works in the following way: by adding F1 to F2, the 1f fundamental and 3f harmonic components cancel due to their relative phase difference of $\pi$. However, adding these two also results in the doubling of all even harmonic components (both those generated in the tissue, and those originally generated in the cMUT itself). Thus, F1 added to F2 will not, by itself, yield a good harmonic image because the 2f tissue-generated harmonic will be obscured by the 2f harmonic generated internally in the cMUT. Since the received components of F3 consist only of cMUT-generated harmonics and not the 2f tissue-generated harmonics, they can be used to exactly subtract out the effect of the cMUT-generated harmonics from the result of adding F1 to F2. To reflect the fact that both F1 and F2 have cMUT-generated harmonics, we must double F3 before subtracting it from the result of F1 added to F2. This leaves only the desired tissue-generated harmonics (or contrast generated harmonics). It should be noted that such cancellation of the transducer generated harmonics is theoretically perfect because the spatial and temporal profile of the harmonics transmitted in the first and second firing is identical to that of the third firing. Only non-idealities of tissue motion, transmit timing jitter, etc., will detract from the perfect cancellation, and thus should be minimized.

To minimize the potential of tissue motion artifacts and to minimize the impact of the practice of the invention on imaging frame rate, firing sequences can be encoded and time gated for a region of interest so that one need not wait for the last echo of the first transmission to arrive before the next transmit event can occur.

Unlike the theoretically perfect cancellation of second harmonics, the cancellation of the fundamental by the formula above will only be perfect at the theoretical focus. Away from the focus, there is clutter from the energy of some of the elements 110 that does not arrive perfectly in phase. The use of multiple focal zones, as practiced in the art, can improve the cancellation of the fundamental. Such a use of multiple focal zones is intended to be within the scope of the present invention.

It should be noted that the present invention is not limited to the specific sequence, composition, and combination of firings outlined above and in FIGS. 4A-C. For example, although the utility of the approach for imaging with even harmonics is emphasized, the cancellation of even harmonics can optimize performance of odd, or 3f, harmonic operation. Even though the spatial variation does not cancel 3f harmonics, transducer generated harmonics at 3f attenuate rapidly, and are less of a problem than 2f harmonics; the ability to filter reception of 3f harmonics without the clutter of transmitted 2f harmonics is desirable. Further still, those skilled in the art will understand that there are many different variations of spatially varying transmit and receive firing sequences, and summing coefficients that will allow for the isolation of tissue or contrast generated harmonics and exclusion of cMUT-generated harmonics. Although the present invention has been particularly described with reference to the preferred embodiments thereof, it should be readily apparent to those of ordinary skill in the art that changes and modifications in the form and details thereof may be made without departing from the spirit and scope of the invention. It is intended that the appended claims include such changes and modifications.

Figure 5:
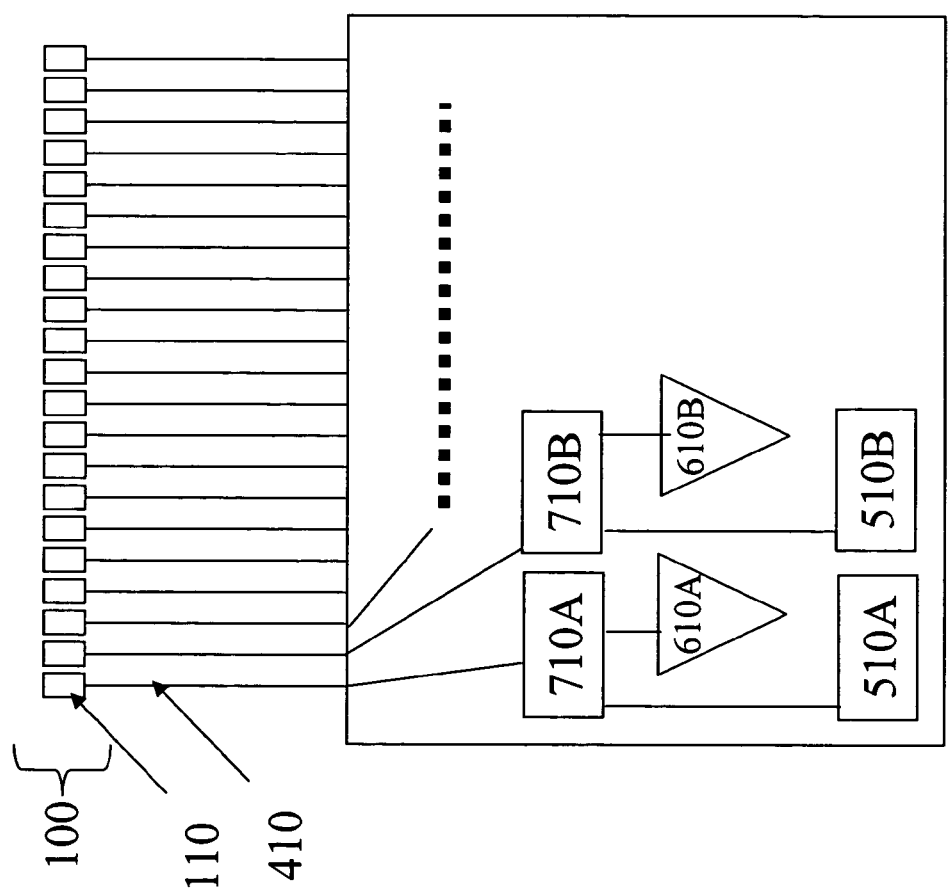
FIG. 5 illustrates the system according to the present invention in its most general form, which applies an arbitrary waveform that substantially alternates transmit signal polarity to adjacent elements so that the fundamental frequency is cancelled while the even harmonics are transmitted.

FIG. 5 illustrates the system of the present invention in its most general form, which applies an arbitrary waveform that substantially alternating transmit signal polarity to adjacent elements so that the fundamental frequency is cancelled while the even harmonics are transmitted. Transmit and receive delays are applied to the transmit and receive waveform of each element in order to form the beam. These delays are preserved in the method of one embodiment of the present invention; only the change to the sign and perturbations to the shape of the waveform of adjacent elements are introduced in order to generate harmonic-only transmit beams. One of ordinary skill in the art will recognize that a benefit, among many, of the present invention is that there can be a common electrode at ground among all of the transducer elements. The combination of the received waveforms of this harmonic firing with the received waveform of at least one other transmit firing will cancel out the effects of the transmitted even harmonics.

Figure 3:
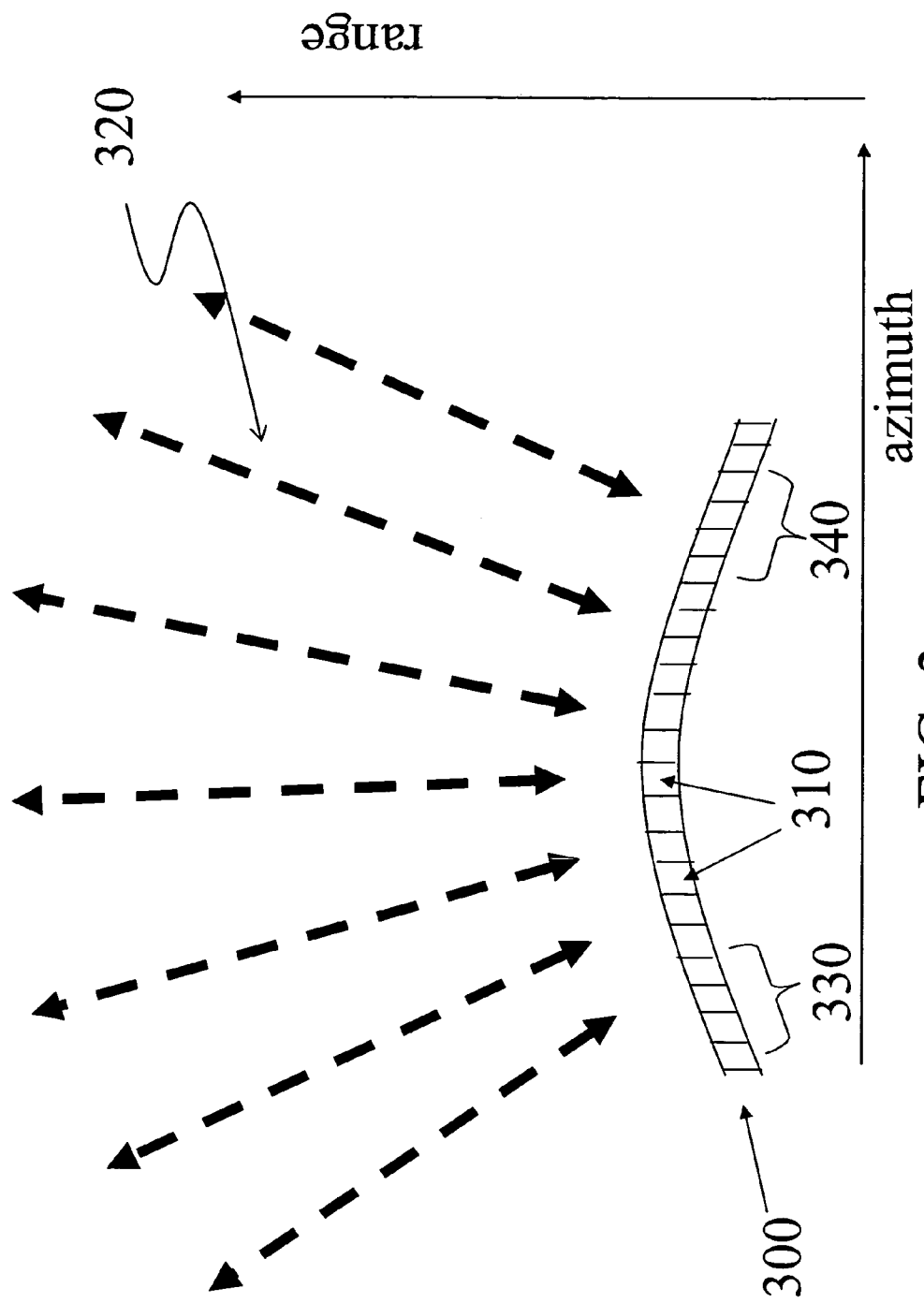
FIG. 3 illustrates a set of imaging vectors from a convex linear probe made of multiple transducer elements.

The exemplary system of FIG. 5 has an equal number of arbitrary waveform transmitters 510, receivers 610, transmit-receive networks 710 and interconnects 410 as transducer elements 110, and the transducer array 100 is a one-dimensional array. However, several other configurations of a system are possible that provide for the subset of elements 110 required to generate a vector of only transmitted harmonics. For example, in the array 300 of FIG. 3, the subset of elements 330 on one side of the array is not involved during a transmit-receive sequence of elements in region 340 of the array, so a multiplexer could be used to connect a smaller number of transmitters, receivers and/or interconnects to the array 300. As a further example, alternating the bias of adjacent transducers can serve to provide for substantial fundamental cancellation and harmonic transmission, as can simple inversion of adjacent transducer signals; a truly arbitrary waveform is not necessary. As yet another exemplary embodiment, the delay of the transmitted waveforms may be altered to optimize the fundamental cancellation of the harmonic transmit in a specific region, as contrasted to the preservation of the delay profiles taught above. Further still, the transducer need not be one-dimensional or linear; two dimensional and annular configurations are also within the scope of the invention, as would be recognized by one skilled in the art.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that while currently commonly available imaging equipment and software prefers transducer elements to be aligned in azimuth, other transducer geometries, such as annular transducers, may become significant. Thus, even though an example is described for a rectangular aperture with transmit-receive channels in azimuth, different configurations of waveform control of adjacent elements might be desirable and are in the scope and spirit of the invention. It is intended that the appended claims include such readily apparent changes and modifications.

What is claimed is:

1. A method of ultrasonically imaging an object that reduces undesired transmitted harmonic distortion comprising the steps of:

generating a plurality of transmit waveforms centered around a predetermined fundamental frequency from a plurality of microfabricated ultrasonic transducer transmit elements that are within a microfabricated transducer array, wherein at least one of the plurality of transmit waveforms generated contains the fundamental frequency and transmitted harmonic frequencies, and wherein at least a second of the plurality of transmit waveforms generates information at harmonic frequencies, the information modeling distortion created by the microfabricated transducer array;

detecting return waveforms associated with the transmit waveforms that are received by microfabricated ultrasonic transducer receive elements within the microfabricated transducer array and generating return signals corresponding thereto, at least one of the return signals having the fundamental frequency and the transmitted harmonic frequencies, and wherein at least a second of the return signals having the information at the harmonic frequencies, the information modeling distortion created by the microfabricated transducer array;

combining the return signals such that signal components having the transmitted fundamental frequency and the transmitted harmonic frequencies are minimized, wherein combining the return signals comprises subtracting out the information at the harmonic frequencies, the information modeling distortion created by the microfabricated transducer array; and imaging by providing data from the combined return signals which represents a harmonic image of the object having reduced transmitted harmonic distortion therein;

wherein the step of generating the plurality of transmit waveforms applies a transmit signal to different transducer transmit elements, the transmit signal applied to the different transducer transmit elements differing in a delay profile; and the information at the harmonic frequencies modeling distortion created by the microfabricated transducer array are generated by alternating the polarity of the transmit signal applied to adjacent transducer transmit elements.

2. The method according to claim 1, wherein the step of generating the plurality of transmit waveforms includes the steps of:

repeating the steps of generating, detecting, and combining for each of a plurality of vectors, each vector formed from three transmit waveforms and three associated return signals.

3. The method according to claim 1, wherein the step of generating the plurality of transmit waveforms includes the step of generating arbitrary signals that are applied to different transducer transmit elements; and the step of detecting detects the return waveform corresponding to the generated arbitrary signals and generates return signals corresponding thereto; and the step of combining the return signals includes combining the return signals to minimize inherent asymmetries and distortions of the microfabricated transducer array.

4. The method according to claim 1 wherein the steps of generating and detecting are applied to multiple focal zones to improve cancellation of the fundamental frequency.

5. The method according to claim 1, wherein the steps of generating and receiving are performed independent of bias applied to the transducer transmit elements and the transducer receive elements.

6. The method according to claim 1, wherein the information at the harmonic frequencies modeling distortion created by the microfabricated transducer array contains substantially only even harmonics generated by the microfabricated transducer array.

7. A method of ultrasonically imaging an object that reduces undesired transmitted harmonic distortion comprising the steps of:

generating a plurality of transmit waveforms centered around a predetermined fundamental frequency from a plurality of microfabricated ultrasonic transducer transmit elements that are within a microfabricated transducer array, wherein at least one of the plurality of transmit waveforms generated contains the fundamental frequency and transmitted harmonic frequencies, and wherein at least a second of the plurality of transmit waveforms generates information at harmonic frequencies, the information modeling distortion created by the microfabricated transducer array;

detecting return waveforms associated with the transmit waveforms that are received by microfabricated ultrasonic transducer receive elements within the microfabricated transducer array and gene rating return signals corresponding thereto, at least one of the return signals having the fundamental frequency and the transmitted harmonic frequencies, and wherein at least a second of the return signals having the information at the harmonic frequencies, the information modeling distortion created by the microfabricated transducer array;

combining the return signals such that signal components having the transmitted fundamental frequency and the transmitted harmonic frequencies are minimized, wherein combining the return signals comprises subtracting out the information at the harmonic frequencies, the information modeling distortion created by the microfabricated transducer array; and imaging by providing data from the combined return signals which represents a harmonic image of the object having reduced transmitted harmonic distortion therein;

wherein the step of generating the plurality of transmit waveforms includes the step of repeating the steps of generating, detecting, and combining for each of a plurality of vectors, each vector formed from three transmit waveforms and three associated return signals; and wherein the three transmit waveforms include:

a first transmit waveform having the fundamental frequency and the transmitted harmonic frequencies;

a second transmit waveform having the fundamental frequency and the transmitted harmonic frequencies, the second transmit waveform being inverted from the first transmit waveform; and a third transmit waveform having the transmitted harmonic frequencies and a greatly reduced fundamental frequency component, the third transmit waveform generated by alternating a polarity of a transmit signal applied to adjacent transducer transmit elements.

8. The method according to claim 7, wherein the first, second and third transmit waveforms are sequentially generated.

9. The method according to claim 8, wherein the step of combining implements the algorithm F1+F2−(2*F3), wherein F1 is received voltage v. time data from the first transmit waveform, F2 is received voltage v. time data from the second transmit waveform, and F3 is received voltage v. time data from the third transmit waveform.

10. An ultrasound system for imaging an object that reduces undesired transmitted harmonic distortion comprising:

a microfabricated transducer array comprising:

a plurality of microfabricated ultrasonic transducer transmit elements operable to generate a plurality of transmit waveforms centered around a predetermined fundamental frequency, wherein a first transmit waveform is of the fundamental frequency and transmitted harmonic frequencies, wherein a second transmit waveform is of the fundamental frequency and the transmitted harmonic frequencies, and wherein a third transmit waveform is of substantially only the transmitted harmonic frequencies, the third transmit waveform generated by alternating a polarity of a transmit signal applied to adjacent transducer transmit elements; and a plurality of microfabricated ultrasonic transducer receive elements operable to detect return waveforms associated with the transmit waveforms and generate return signals corresponding thereto, wherein a first return signal is of the fundamental frequency and the transmitted harmonic frequencies, wherein a second return signal is of the fundamental frequency and the transmitted harmonic frequencies, and wherein a third return signal is of substantially only the transmitted harmonic frequencies;

a mathematical processor operable to create image data representing a harmonic image of the object by:
combining the first and second return signals; and
subtracting out the third return signal; and a display operable to show the image data.

11. The ultrasound system according to claim 10, wherein the transducer transmit elements are further operable to invert the second transmit waveform from the first transmit waveform by a difference in delay profile from the first transmit waveform.

12. The ultrasound system according to claim 10, wherein the transducer transmit elements are further operable to generate the first, second, and third transmit waveforms serially for each of a plurality of image frame vectors.

13. The ultrasound system according to claim 10, wherein the mathematical processor is operable to subtract out the third return signal by subtracting out the third return signal twice.

* * * * *